(12) United States Patent
Lee et al.

(10) Patent No.: US 8,702,251 B2
(45) Date of Patent: Apr. 22, 2014

(54) LIGHT-COLLECTING HELIOSTAT USING FLAT MIRRORS

(75) Inventors: Sang-Nam Lee, Daejeon (KR);
Jong-Kyu Kim, Daejeon (KR);
Yong-Heack Kang, Daejeon (KR)

(73) Assignee: Korea Institute of Energy Research (KR)

( * ) Notice: Subject to any disclaimer, the term of this patent is extended or adjusted under 35 U.S.C. 154(b) by 114 days.

(21) Appl. No.: 13/498,456

(22) PCT Filed: Apr. 11, 2011

(86) PCT No.: PCT/KR2011/002528
§ 371 (c)(1),
(2), (4) Date: Mar. 27, 2012

(87) PCT Pub. No.: WO2011/149185
PCT Pub. Date: Dec. 1, 2011

(65) Prior Publication Data
US 2012/0182635 A1      Jul. 19, 2012

(30) Foreign Application Priority Data

May 27, 2010    (KR) .................. 10-2010-0049757

(51) Int. Cl.
*G02B 5/10*         (2006.01)

(52) U.S. Cl.
USPC ........... 359/853; 359/871; 359/872; 359/873; 359/875; 359/877; 136/246

(58) Field of Classification Search
USPC ......... 359/850, 853–855, 871–873, 875, 877, 359/878; 136/246; 126/683–685, 687, 696
See application file for complete search history.

(56) References Cited

U.S. PATENT DOCUMENTS

| | | | |
|---|---|---|---|
| 4,110,010 A | | 8/1978 | Hilton |
| 4,129,360 A | * | 12/1978 | Deflandre et al. ............ 359/853 |
| 4,466,423 A | * | 8/1984 | Dolan et al. .................. 126/571 |
| 6,227,673 B1 | * | 5/2001 | O'Hara-Smith .............. 359/850 |
| 7,192,146 B2 | * | 3/2007 | Gross et al. .................. 359/853 |
| 2010/0195227 A1 | * | 8/2010 | Green .......................... 359/853 |
| 2010/0263709 A1 | * | 10/2010 | Norman et al. .............. 136/246 |
| 2012/0218652 A1 | * | 8/2012 | Stone et al. .................. 359/853 |

FOREIGN PATENT DOCUMENTS

| KR | 10-2001-0044463 | 6/2001 |
|---|---|---|
| KR | 10-0939928 | 1/2010 |
| KR | 10-2010-0048331 | 5/2010 |

OTHER PUBLICATIONS

International Search Report—PCT/KR2011/002528 dated Dec. 14, 2011.

* cited by examiner

*Primary Examiner* — Frank Font
(74) *Attorney, Agent, or Firm* — Cantor Colburn LLP

(57) ABSTRACT

Disclosed is a light-collecting heliostat using flat mirrors of enhanced light-collecting efficiency. The gradients of low-price flat mirrors are adjusted when reflecting sunlight by the heliostat equipped with the flat mirrors, thereby causing reflection focal areas having the same size as each of the mirrors to overlap, in the same number as the number of the reflective plates constituting the heliostat, on a heat collecting unit of collecting lights, so that a high temperature light-collecting focal area with a uniform temperature distribution is obtained.

15 Claims, 11 Drawing Sheets

LIGHT-COLLECTING HELIOSTAT USING FLAT MIRRORS

BACKGROUND OF THE INVENTION

1. Field of the Invention

The present invention relates to a heliostat. In more particular, the present invention relates to a light-collecting heliostat using flat mirrors, which does not only reflect the sunlight, but also concentrates the sunlight on one area at a high temperature, so that the concentrated sunlight can be used as a heat source of a solar thermal power plant.

Especially, the present invention relates to a heliostat using flat mirrors, in which the lights, which are reflected from the heliostat having a plurality of low-price flat mirrors arranged thereon for the reflection of the sunlight, represent one uniform temperature distribution while providing high-temperature light-collecting focal areas.

2. Description of the Related Art

Many power generators using natural power have been developed according to the depletion of fossil fuel. One of the power generators uses solar heat. Among the power generators using solar heat, there are solar thermal power plants. The solar thermal power plants are classified into a dish-type solar thermal power plant using a reflective plate and a tower-type solar thermal power plant using a heliostat.

Among them, the dish-type solar thermal power plant includes a dish-type reflective plate. In the case of the dish-type reflective plate, mirrors must be installed in such a manner that focal areas of the mirrors are concentrated on one area in order to concentrate lights from the mirrors on the one area. Accordingly, there are many difficulties when installing the mirrors.

In addition, since each mirror constituting the dish-type reflective plate must have a paraboloid in order to improve light collecting efficiency, there are many difficulties when manufacturing the mirrors.

Meanwhile, the tower-type solar thermal power plant uses lights reflected from the heliostat as a power source to drive a turbine.

In the tower-type solar thermal power plant, a reflective mirror of a heliostat to reflect lights requires high manufacturing cost, and is made of curved glass requiring a complex manufacturing process. In addition, for the purpose of high-temperature light collection, a great number of heliostats must be provided in such a manner that a plurality of scattered focal areas are overlapped with each other to obtain high temperature, and a light collecting unit having an area wider than a reflection area of the heliostat must be installed.

Further, in the tower-type solar thermal power plant, the lights reflected from the heliostat must be uniformly collected at a predetermined region of a heat collecting unit and irradiated onto the heat collecting unit in order to uniformly heat the entire portion of the light collecting unit, so that the power generation efficiency can be increased. However, if the curved glass is used as described above so that reflective mirrors having no uniform focal areas are provided in the manufacturing process, heat is concentrated onto only a specific region, so that the efficiency of the heat collecting unit not only be degraded, but the heat collecting unit can be easily aged due to the temperature difference.

SUMMARY OF THE INVENTION

Accordingly, the present invention has been made keeping in mind the above problems occurring in the prior art, and an object of the present invention is to provide a light-collecting heliostat using flat mirrors, in which the light-collecting heliostat has a simple structure, so that the light-collecting heliostat can be easily manufactured, and the lights reflected from the flat mirrors are focused on at a predetermined distance region by adjusting the angles of the flat mirrors, so that the light collecting ratio can be improved.

Another object of the present invention is to provide a light-collecting heliostat using flat mirrors, in which the lights reflected by flat mirrors are uniformly irradiated into a predetermined region of a heat collecting unit, so the heat collecting unit can uniformly receive heat throughout the entire portion thereof to represent uniform temperature distribution on the whole surface thereof, so that the aging of the heat collecting unit caused by the difference in the thermal expansion coefficient resulting from the partial temperature difference of the heat collecting unit can be prevented. In addition, the area of a heat collecting unit according to the related art must be wider than a reflection area of a heliostat in order to receive lights reflected from the heliostat without the loss of the lights. However, the present invention can provide a light-collecting heliostat using flat mirrors employing an improved heat collecting unit.

To accomplish these objects, according to one aspect of the present invention, there is provided a light-collecting heliostat using flat mirrors, which include a support frame supported by a column, at least two reflective plates installed on a front surface of the support frame, and an angle adjusting unit interposed between the reflective plates and the support frame to adjust angles of the reflective plates so that angles between the reflective plates and the support frame are adjusted to collect lights reflected from the reflective plates on one focal area.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a light-collecting heliostat according to embodiments of the present invention will be described in detail with reference to accompanying drawings.

The greatest feature of the light-collecting heliostat using the flat mirrors according to the present invention is made in that the light-collecting heliostat employs flat mirrors, and lights reflected from each flat mirror are collected in a predetermined distance range.

The light-collecting heliostat using flat mirrors according to the present invention includes a support frame 1 supported by a column 10, at least two reflective plates 2 installed on a front surface of the support frame 1, and angle adjusting units 3 installed between the reflective plates 2 and the support frame 1 to adjust angles of the reflective plates so that the angles between the reflective plates 2 and the support frame 1 are adjusted to collect lights reflected from the reflective plate 2 on one focal area.

Figure 1:
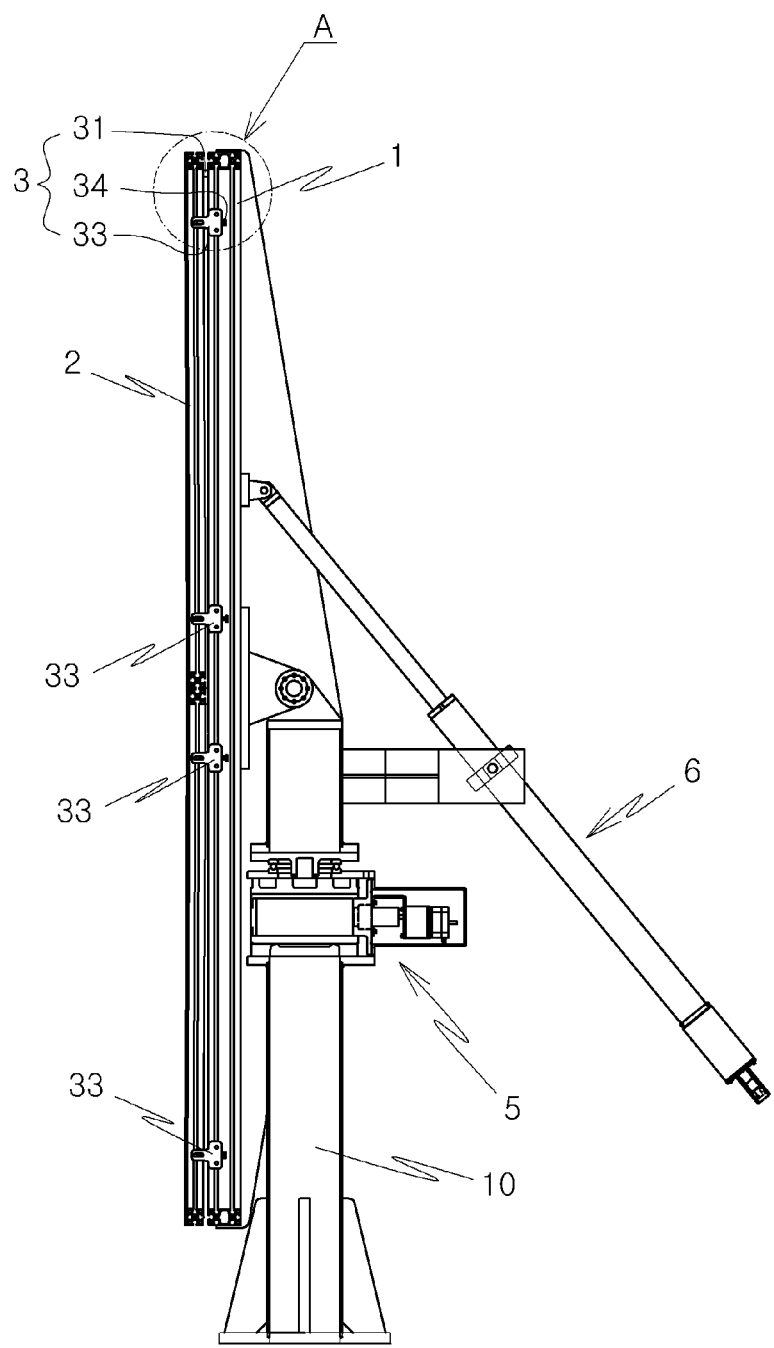
FIG. 1 is a side view showing one example of a light-collecting heliostat using flat mirrors according to the present invention.
Figure 11:
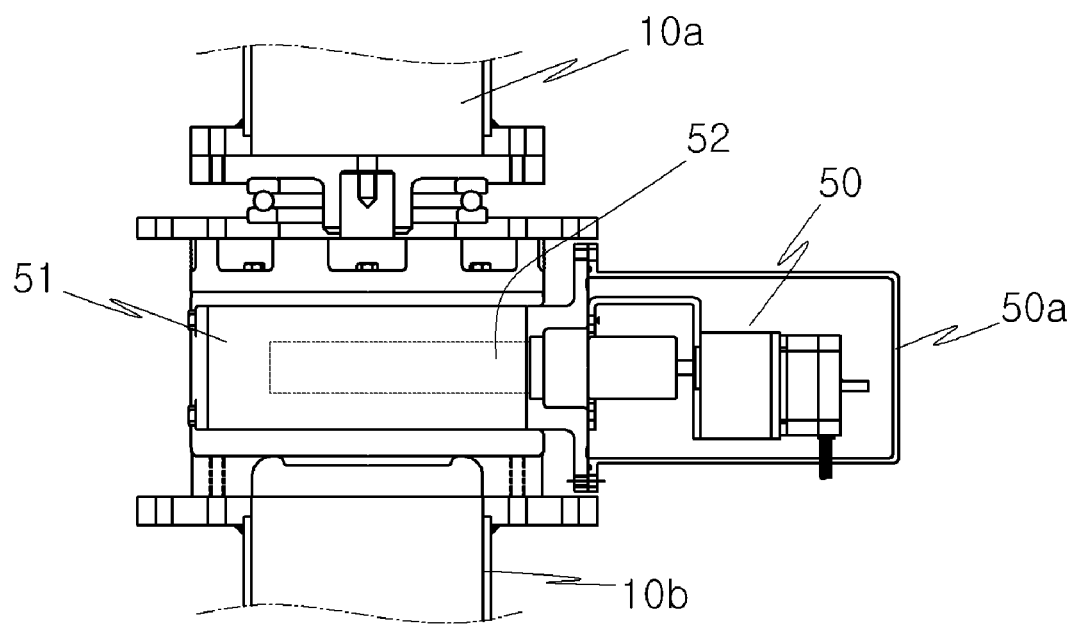
FIG. 11 is a side view showing a rotational unit of the light-collecting heliostat according to the present invention.

As shown in FIG. 1, the support frame 1 has a rear surface coupled with the column 10. The column 10 includes an upper column 10a and a lower column 10b as shown in FIG. 11. The lower column 10b is fixed onto the ground surface, the upper column 10a is rotatable about the lower column 10b, and the support frame 1 is coupled with the upper column 10a, so that the direction of the support frame 1 can be changed by rotating the support frame 1 while maintaining the support frame 1 in the horizontal state.

An azimuth angle adjusting unit 5 is provided to rotate the support frame 1, and includes a worm wheel 51 coupled with a lower end of the upper column 10a on which the support frame 1 is rotatably installed, and a worm 52 coupled with a shaft of a motor 50 mounted on the lower column 10b fixed onto the ground to rotate the worm wheel 51.

In other words, if the worm 52 is rotated by driving the motor 50, the worm wheel 51 is rotated to rotate the upper column 10a, so that the direction of the support frame 1 is changed.

When the direction of the support frame 1 can be changed as described above, the direction of the reflective plate 2 can be changed according to the direction of the sun, that is, the azimuth angle, so that the sunlight can be more effectively reflected from the light-collecting heliostat. To this regard, in order to allow the reflective plate to face the sun, a unit to change the direction of the reflective plate into a vertical direction is required as well as the rotational unit. The unit includes an altitude angle adjusting unit 6.

The altitude angle adjusting unit 6 may include a hydraulic cylinder or a motor cylinder.

As shown in FIG. 1, in the altitude angle adjusting unit 6, an end portion of a rod extensible from a cylinder having the intermediate portion rotatably coupled with the upper column 10a is rotatably coupled with the rear surface of the support frame 1 by using a hinge. As the rod is extended from or withdrawn into the cylinder by a hydraulic pressure or by driving of the electric motor, the support frame 1 may have various angles about the ground surface or the column 10.

The operations of the azimuth angle adjusting unit 5 or the altitude angle adjusting unit 6 are controlled according to the positions of the sun. A generally-known sun tracking system may be selectively used to control the operation of the azimuth angle adjusting unit 5 or the altitude angle adjusting unit 6 so that the sun can be tracked, and the details thereof will be omitted.

Figure 2:
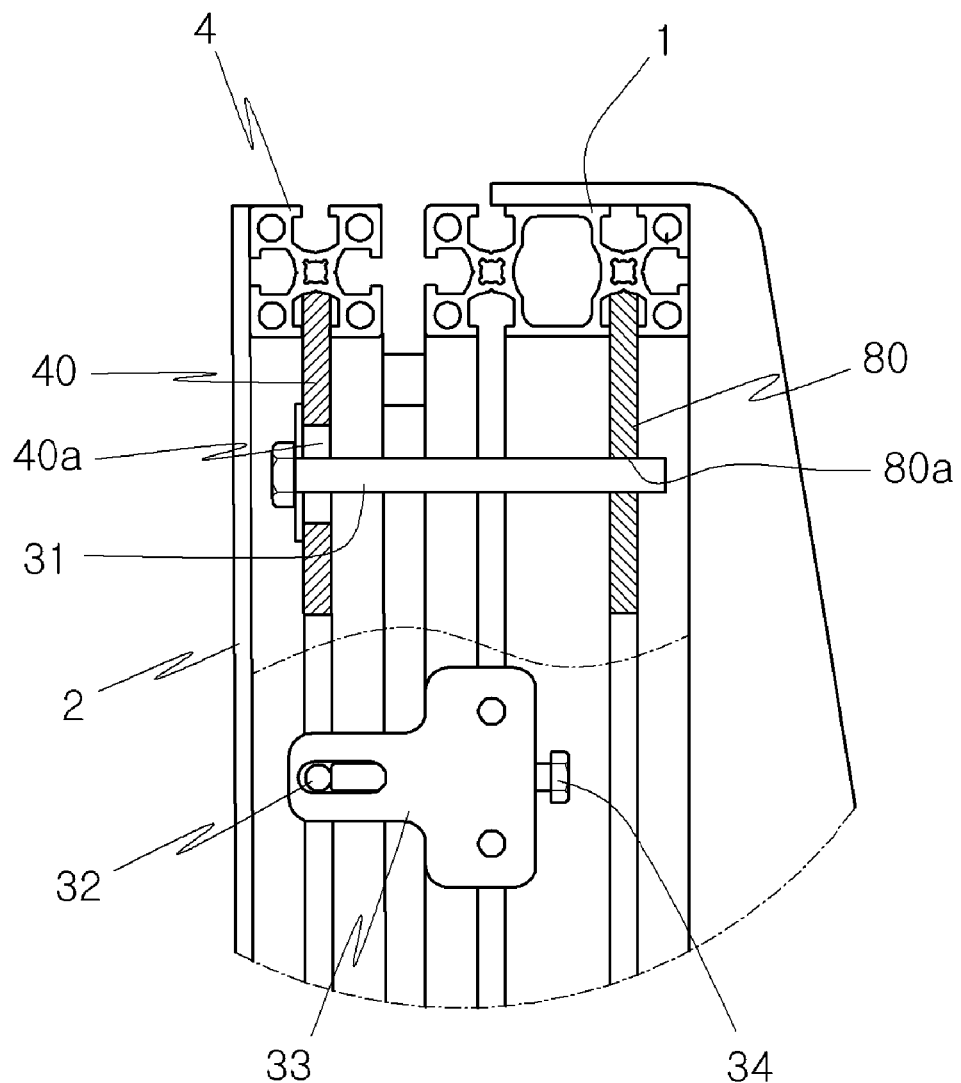
FIG. 2 is an enlarged view showing a part A of FIG. 1.
Figure 4:
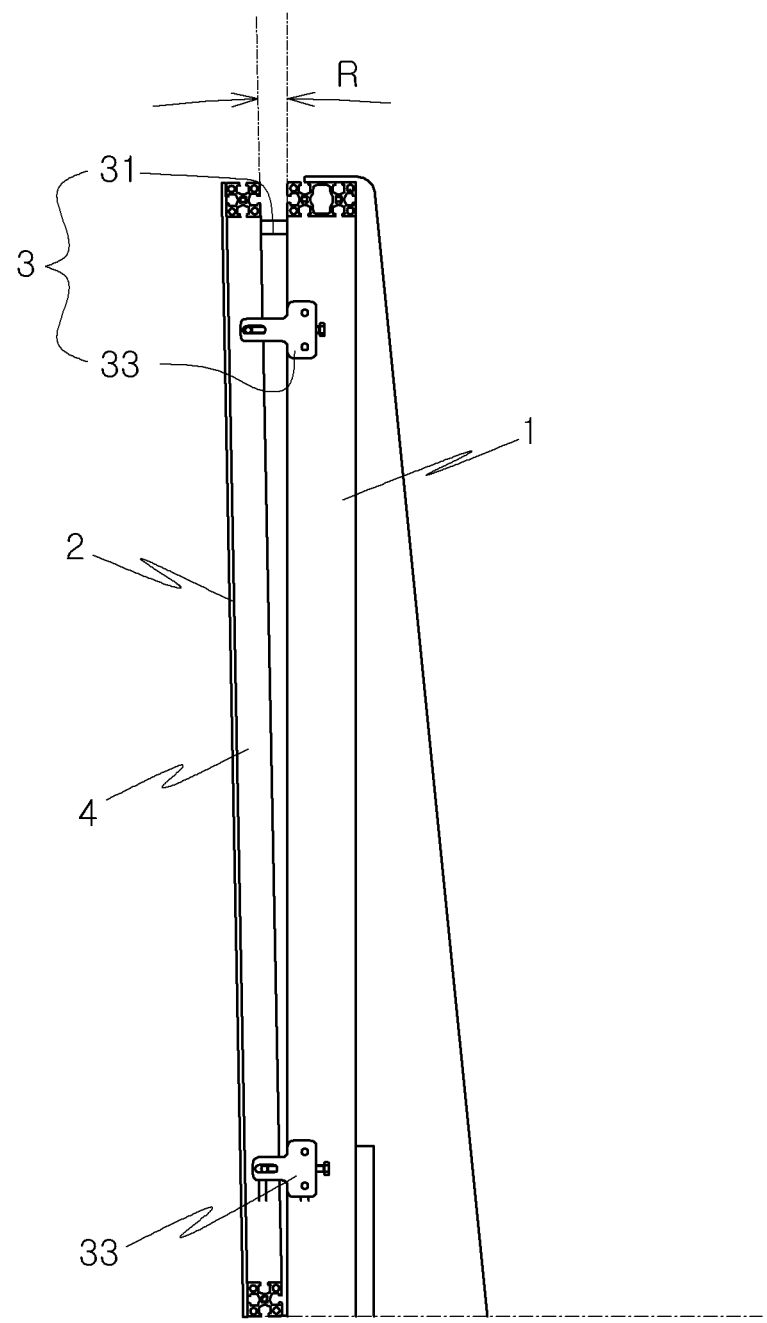
FIG. 4 is a side view showing the state in which the gradient of mirrors is adjusted in the light-collecting heliostat using the flat mirrors according to the present invention.

The reflective plate 2 includes flat mirrors to actually reflect the sunlight. As shown in FIGS. 1, 2, and 4, at least two reflective plates 2 are installed on the support frame 1.

The reflective plates 2 can uniformly reflect lights in a specific distance range of a heat collecting unit. In order to collect lights reflected from the at least two reflective plates 2 in a predetermined distance range, the angles of the reflective plates 2 must be adjusted.

In order to adjust the angles of the reflective plates as described above, the angle adjusting unit of the reflective plates 2 must be installed between the support frame 1 and the reflective plates 2. However, in general, since the mirrors constituting the reflective plates 2 include a material having high strength and a breakable property, the angle adjusting unit 3 may not be directly installed on the reflective plates 2.

Accordingly, the reflective plates 2 are fixedly installed on a front surface of a reflective plate frame 4, and the angle adjusting unit 3 is interposed between the reflective plate frame 4 and the support frame 1.

The angle adjusting unit 3 adjusts the angle of each reflective plate 2 about the support frame 1 as described above, and the angle between the reflective plate 2 and the support frame 1 is varied according to the distance between the light-collecting heliostat according to the present invention and a heat collecting unit.

Figure 5:
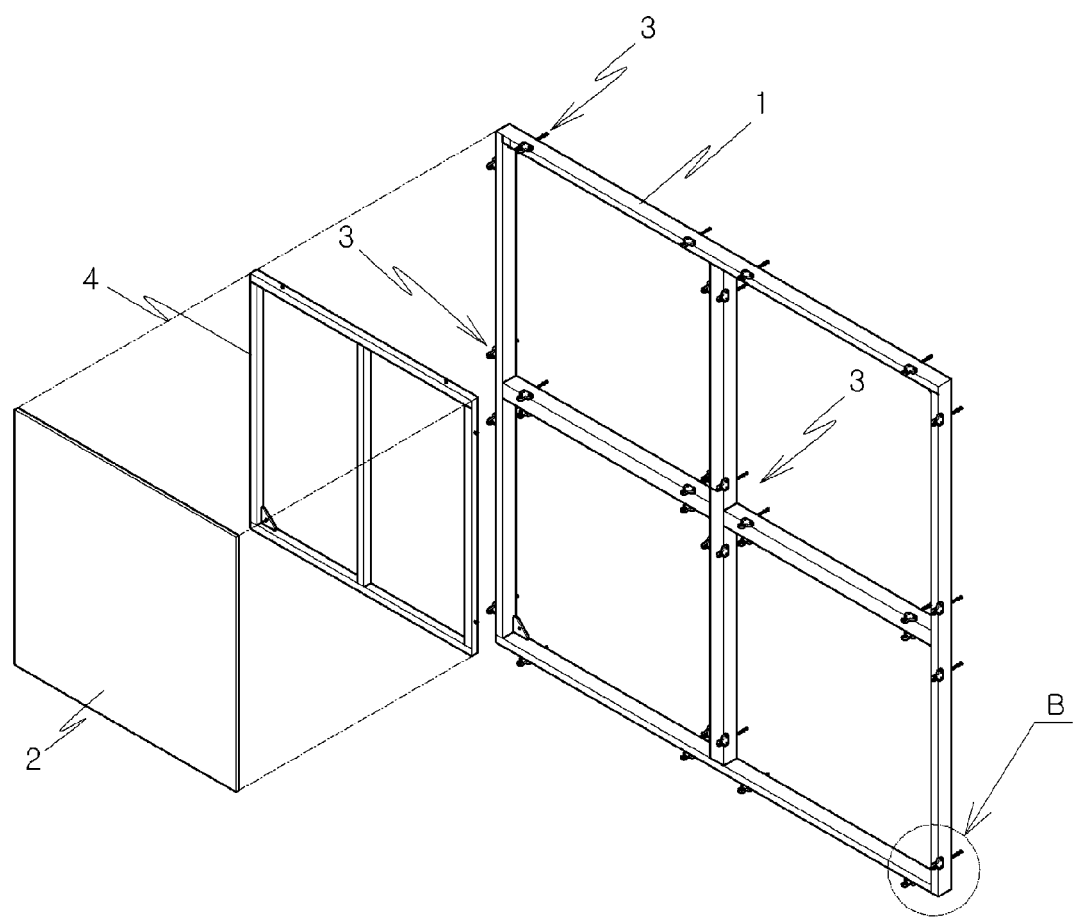
FIG. 5 is an exploded perspective view showing the light-collecting heliostat using the flat mirrors according to the present invention.

As shown in FIG. 5, the angle adjusting units 3 are installed between four corners of the reflective plate frame 4 and portions of the support frames 1 corresponding to the four corners of the reflective plate frame 4.

Figure 3:
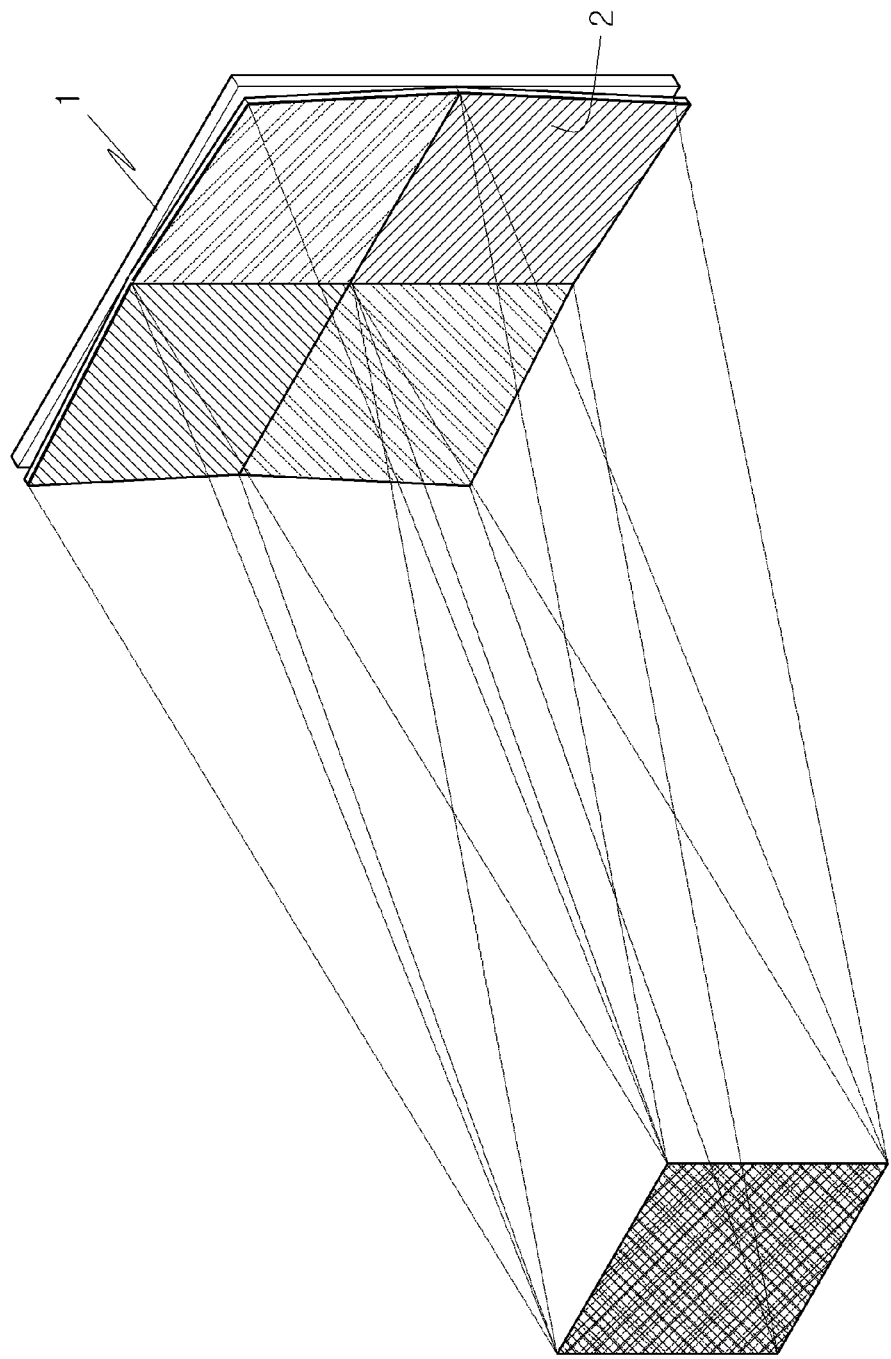
FIG. 3 is a perspective view showing the state in which the light-collecting heliostat using the flat mirrors according to the present invention collects lights.

In other words, the angle adjusting units 3 fix the four corners of the reflective plate frame 4 to the support frame 1 while adjusting the distance between the support frame 1 and the four corners of the reflective plate frame 4, so that the angles between the support frame 1 and the reflective plates 2 may be varied as shown in FIGS. 3 and 4.

One example of the angle adjusting units 3 is shown in FIGS. 6 to 9.

As shown in FIGS. 6 to 9, the angle adjusting unit 3 includes a height adjusting bolt 31 fastened into a female screw 80a, which is provided in a fixing plate 80 installed at a corner of the support frame 1, and provided at an end portion thereof with a support protrusion 31a fitted into an elongated hole 40a, which is formed in a connection plate 40 installed at a corner of the reflective plate frame 4, such that the support protrusion 31a can be supported by the elongated hole 40a, a bracket 33 installed adjacent to an edge of the support frame 1 and provided therein with an elongated hole 33a through which a bolt passes, and an anchor bolt 34 passing through the elongated hole 33a formed in the bracket 33 and fastened into a nut 32 which is provided in a sidewall of the reflective plate frame 4 to connect the bracket 33 to the reflective plate frame 4.

Figure 6:
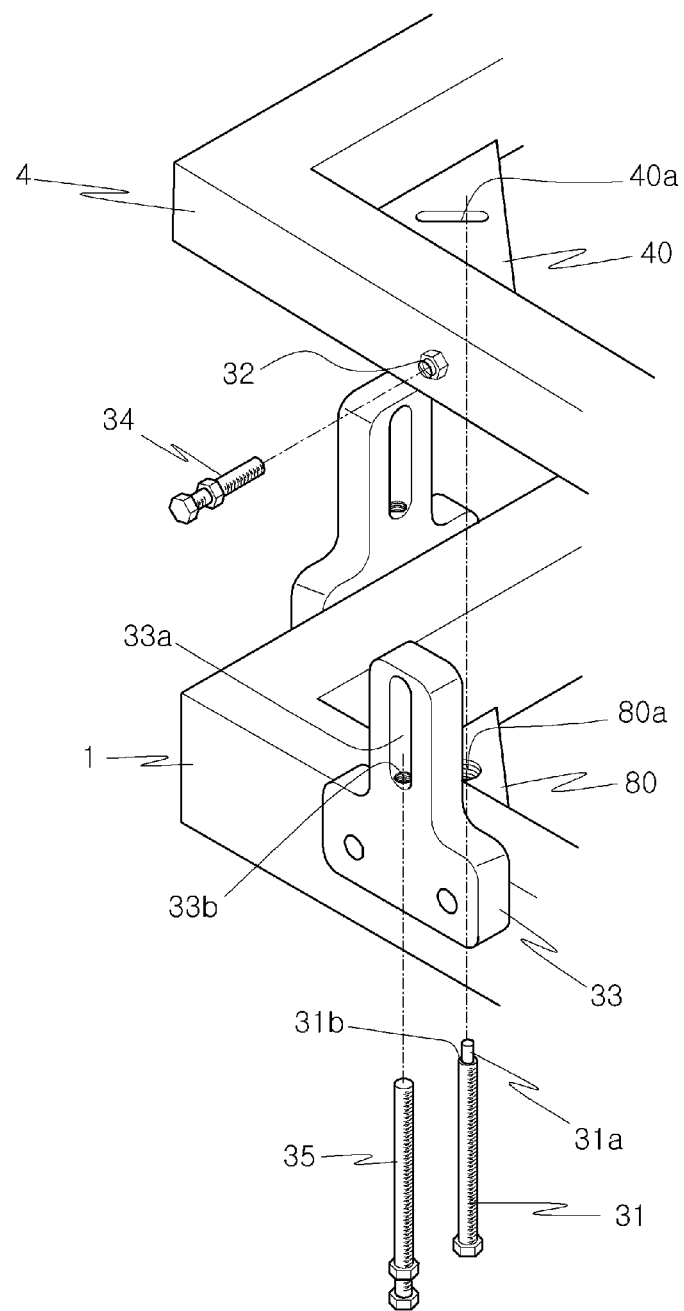
FIG. 6 is an exploded perspective view showing one example of an angle adjusting unit of the light-collecting heliostat using the flat mirrors according to the present invention.
Figure 7:
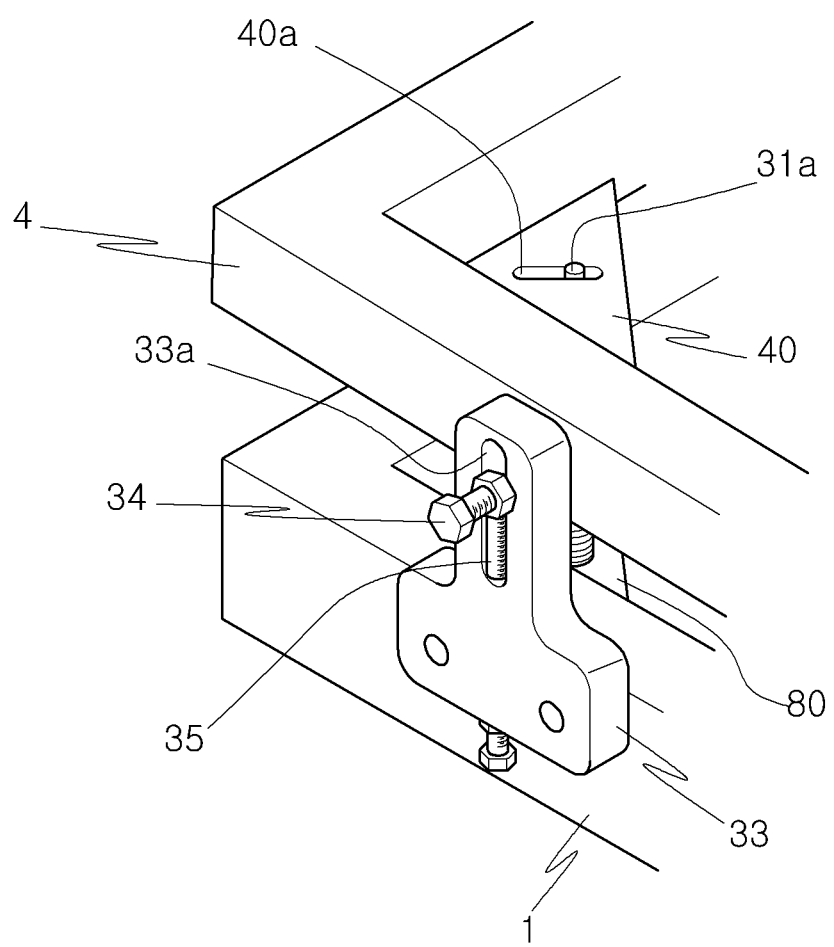
FIG. 7 is a perspective view showing one example of the angle adjusting unit of the light-collecting heliostat using the flat mirrors according to the present invention.

As shown in FIG. 6, an intermediate portion of the height adjusting bolt 31 is fastened into the female screw 80a provided in the fixing plate 80 installed at the corner of the support frame 1, and an end portion of the height adjusting bolt 31 pushes the connection plate 40 installed at the corner of the reflective plate frame 4.

If the end portion of the height adjusting bolt 31 is configured to push the connection plate 40 installed at the reflective plate frame 4, the end portion of the height adjusting bolt 31 may be slid from the connection plate 40. Accordingly, the end portion of the height adjusting bolt 31 must be coupled with the connection plate 40. In order to couple the end portion of the height adjusting bolt 31 with the connection plate 40, the connection plate 40 is formed therein with the elongated hole 40a as described above, so that the end portion of the height adjusting bolt 31 is fitted into the elongated hole 40a.

Figure 8:
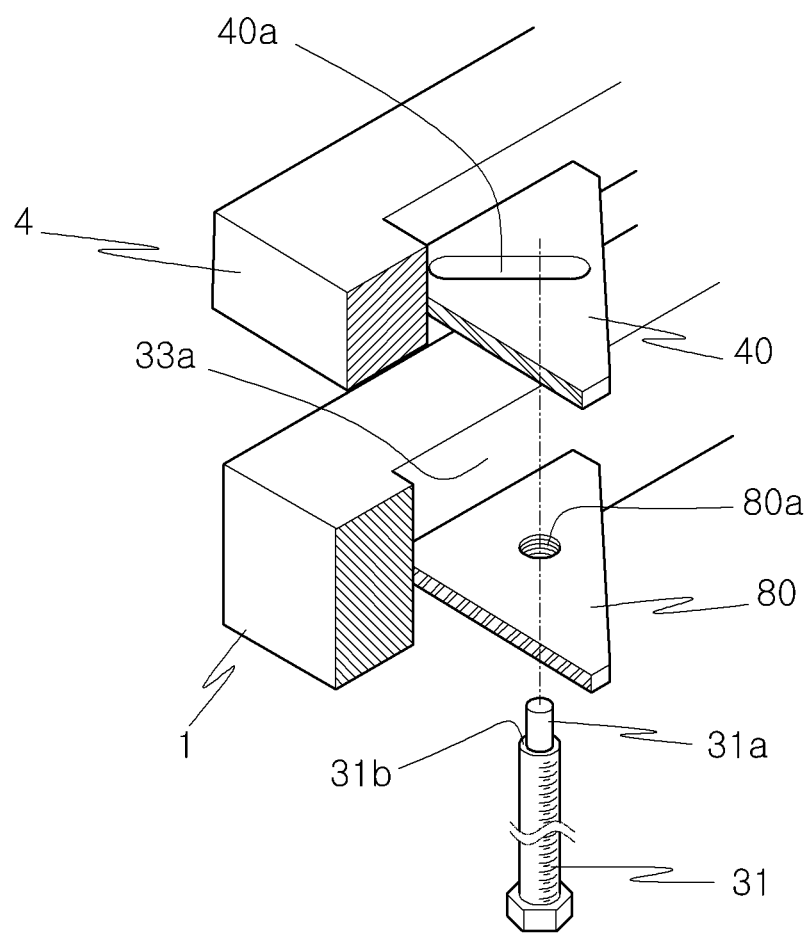
FIG. 8 is a perspective view showing a connection part between a fixing plate and a connecting plate constituting the angle adjusting unit.
Figure 9:
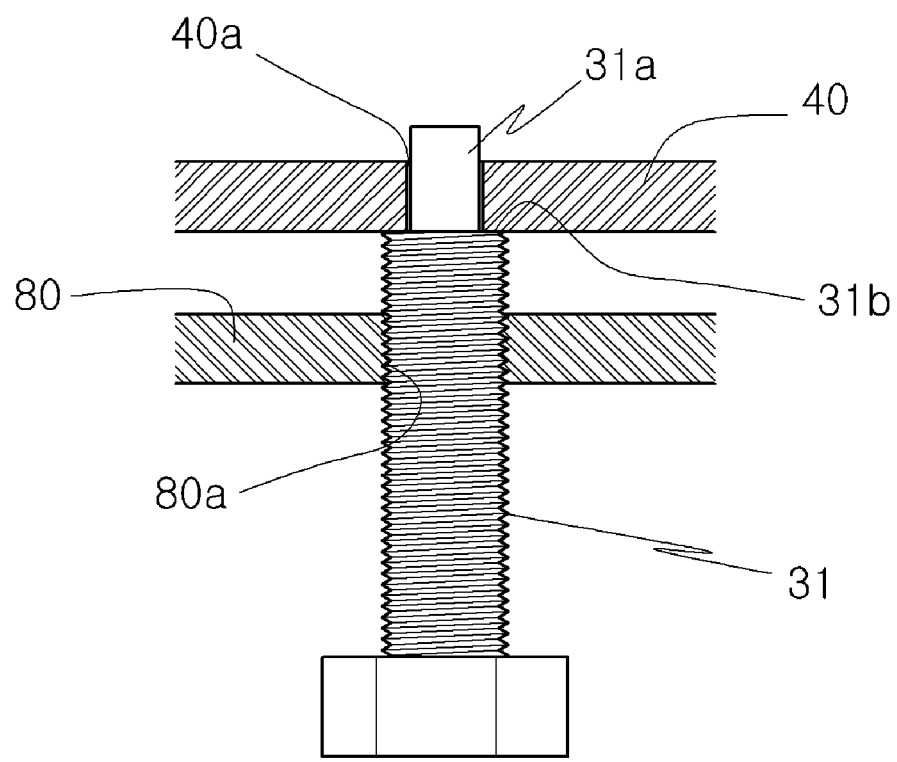
FIG. 9 is a sectional view showing the connection part between the fixing plate and the connecting plate constituting the angle adjusting unit.

The height adjusting bolt 31 has a function of pushing the connection plate 40 as described above. However, if the end portion of the height adjusting bolt 31 passes through the elongated hole 40a formed in the connection plate 40, the height adjusting bolt 31 cannot push the connection plate 40. Accordingly, as shown in FIGS. 6, 8, and 9, the support protrusion 31a, which has a smaller diameter and is fitted into the elongated hole 40a, is formed on the end portion of the height adjusting bolt 31 and a locking step 31b is formed between the support protrusion 31a and the body of the height adjusting bolt 31, so that the locking step 31b is locked with the rim of the elongated hole 40a to push the connection plate 40.

As described above, the distance between the fixing plate 80 installed at the support frame 1 and the connection plate 40 installed at the reflective plate frame 4 is adjusted by fastening or releasing the high adjusting unit 31, and the angle between the support frame 1 and the reflective plate frame 4 is adjusted by adjusting the height adjusting bolts 31 installed at four corners of the reflective plate frame 4.

The reflective plate frame 4 must be fixed after adjusting the angle between the support frame 1 and the reflective plate frame 4 by fastening or releasing the height adjusting bolt 31. Units to connect the reflective plate frame 4 with the support frame 1 and to fix the reflective plate frame 4 to the support frame 1 are the bracket 33 and the anchor bolt 34, respectively.

In other words, in the state that one side of the bracket 33 has been fixed to the support frame 1, if the anchor bolt 34 is fastened into the nut 32 provided in the sidewall of the reflective plate frame 4 by fastening the anchor bolt 34 through the elongated hole 33a formed in the bracket 33 having one side fixed to the support frame 1, the bracket 33 is coupled with the reflective plate frame 4.

As described, the reflective plate 2 is installed at the reflective plate frame 4. In addition, since the reflective plate 2 has a wide plate shape, the reflective plate 2 may be moved back by wind if the wind blows.

If the support frame 1 and the reflective plate frame 4 are supported only by the height adjusting bolt 31 when the reflective plate frame 4 is pushed by the wind as described above, the reflective plate frame 4 is moved to the support frame 1, so that the angle of the reflective plate 2 may be changed.

Therefore, the angle adjusting unit 3 further includes a support bolt 35 to support the anchor bolt 34 to prevent the reflective plate frame 4 from being moved back toward the support frame 1.

In other words, the bracket 33 is provided therein with a nut part 33b, which passes through the bracket 33 while extending from one end portion of the bracket 33 to the elongated hole 33a and is provided at an inner peripheral surface thereof with a female screw, and the support bolt 35 is fastened into the nut part 33b to push the anchor bolt 34 fastened through the elongated hole 33a, thereby preventing the reflective plate frame 4 from being moved back toward the support frame 1.

Figure 10:
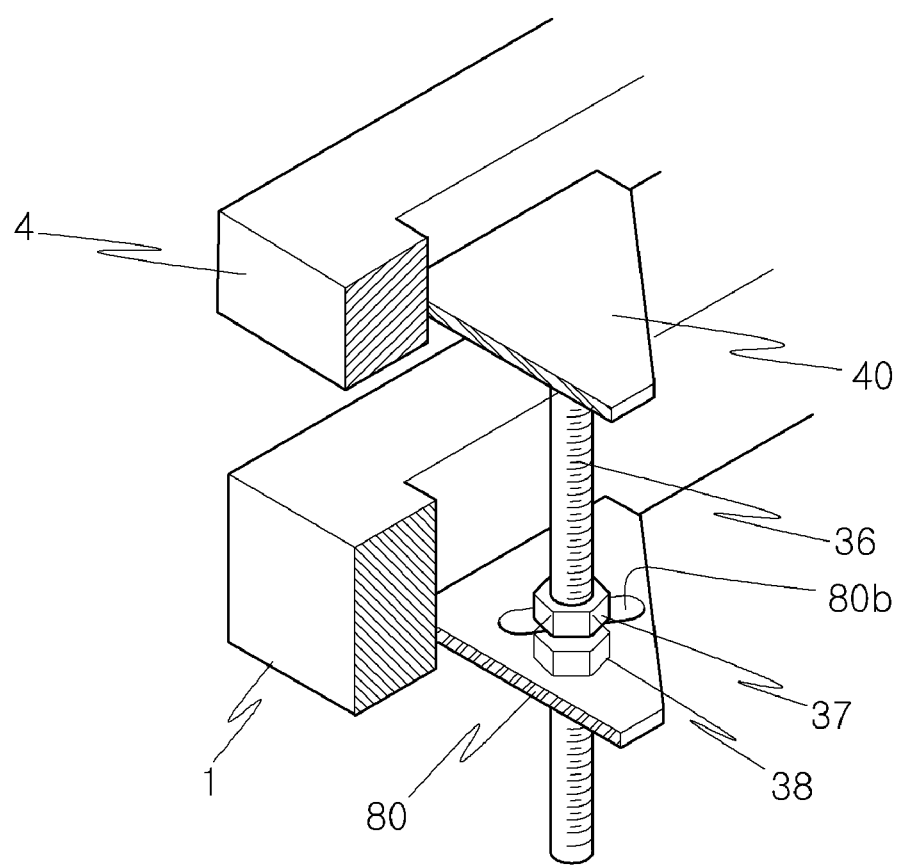
FIG. 10 is an exploded perspective view showing another example of an angle adjusting unit of the light-collecting heliostat according to the present invention.

Another example of the angle adjusting unit is shown in FIG. 10.

As shown in FIG. 10, the angle adjusting unit 3 may include a bolt 36 integrally formed with a bottom surface of the connection plate 40 installed at the corner of the reflective plate frame 4 and fixing nuts 37 and 38 which are fastened around the bolt 36 on top and bottom surfaces of the fixing plate 80 while passing through the elongated hole 80b formed in the fixing plate 80 installed at the corner of the support frame 1.

The angle adjusting unit 3 having the above structure adjusts the angle between the support frame 1 and the reflective plate frame 4 as the distance between the connection plate 40 and the fixing plate 80 is adjusted by fastening or releasing the fixing nuts 37 and 38 constituting each of the angle adjusting units installed at four corners of the reflective plate frame 4.

Although the present invention has been described in that four reflective plates are provided in accompanying drawings, at least two or four reflective plates may be provided.

However, in order to more easily adjust the angle of the reflective plate, four reflective plates are preferably provided.

According to the light-collecting heliostat using flat mirrors of the present invention having the above structure, since the reflective plates include flat mirrors, the reflective plates may be easily manufactured, and lights reflected from the reflective plates are uniformly irradiated into a desirable region of a heat collecting unit. Accordingly, the reflected lights are uniformly irradiated into the predetermined region of the heat collecting unit, so that the heat collecting unit uniformly receives heat in an entire portion thereof to represent uniform temperature distribution on the whole surface thereof. Accordingly, heat collecting efficiency can be increased, and the aging of the heat collecting unit caused by the difference in the thermal expansion coefficient resulting from the partial temperature difference of the heat collecting unit can be prevented.

Since the present invention is constructed by using flat mirrors, the work of manufacturing reflective plates and the work of assembling the reflective plates can be easily performed.

In particular, since the reflective plates include flat mirrors, the lights reflected from the reflective plates are uniformly irradiated into a desirable region of a heat collecting unit. As described above, the lights reflected from the reflective plate are uniformly irradiated into the heat collecting unit in a predetermined distance region, so that the heat collecting unit can receive heat throughout the entire portion thereof to represent uniform temperature distribution on the whole surface thereof. In addition, the heliostat having a plurality of flat mirrors can adjust the gradient of each flat mirror. Accordingly, since reflection focal areas having the size corresponding to the size of the flat mirrors can be overlapped with each other on the heat collecting unit of collecting light as many as the number of the flat mirrors, high heat collection efficiency can be obtained by high-temperature focal areas representing uniform temperature distribution.

In addition, according to the present invention, the aging of the heat collecting unit caused by the difference in the thermal expansion coefficient resulting from the partial temperature difference of the heat collecting unit can be prevented.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A light-collecting heliostat using flat mirrors, the light-collecting heliostat comprising: a support frame supported by a column; at least two reflective plates installed on a front surface of the support frame; and an angle adjusting unit interposed between the reflective plates and the support frame to adjust angles of the reflective plates so that angles between the reflective plates and the support frame are adjusted to collect lights reflected from the reflective plates on one focal area, wherein the reflective plates are fixedly installed on a front surface of a reflective plate frame, and the angle adjusting unit is interposed between the reflective plate frame and the support frame, wherein the angle adjusting unit comprises: a height adjusting bolt fastened into a female screw, which is provided in a fixing plate installed at a corner of the support frame, and provided at an end portion thereof with a support protrusion fitted into a first elongated hole, which is formed in a connection plate installed at a corner of the reflective plate frame, such that the support protrusion is supported by the first elongated hole; a bracket installed adjacent to an edge of the support frame and provided therein with a second elongated hole through which a bolt passes; and an anchor bolt passing through the second elongated hole formed in the bracket and fastened into a nut which is provided in a sidewall of the reflective plate frame to connect the bracket to the reflective plate frame.

2. The light-collecting heliostat of claim 1, wherein the bracket is further provided therein with a nut part, which passes through the bracket while extending from one end portion of the bracket to the second elongated hole and is provided at an inner peripheral surface thereof with a female screw, and a support bolt is provided into the nut part to push the anchor bolt fastened through the second elongated hole such that the support bolt supports the anchor bolt.

3. The light-collecting heliostat of claim 2, wherein the support frame is fixedly installed on the column by an azimuth angle adjusting unit and an altitude angle adjusting unit to adjust horizontal and vertical angles of the reflective plates.

4. The light-collecting heliostat of claim 3, wherein the azimuth angle adjusting unit comprises:
a worm wheel coupled with a lower end of an upper column on which the support frame is rotatably installed; and
a worm coupled with a shaft of a motor mounted on a lower column fixed onto a ground to rotate the worm wheel.

5. The light-collecting heliostat of claim 3, wherein the altitude angle adjusting unit includes a hydraulic cylinder.

6. The light-collecting heliostat of claim 3, wherein the altitude angle adjusting unit includes a motor cylinder.

7. The light-collecting heliostat of claim 1, wherein the support frame is fixedly installed on the column by an azimuth angle adjusting unit and an altitude angle adjusting unit to adjust horizontal and vertical angles of the reflective plates.

8. The light-collecting heliostat of claim 7, wherein the azimuth angle adjusting unit comprises:
a worm wheel coupled with a lower end of an upper column on which the support frame is rotatably installed; and
a worm coupled with a shaft of a motor mounted on a lower column fixed onto a ground to rotate the worm wheel.

9. The light-collecting heliostat of claim 7, wherein the altitude angle adjusting unit includes a hydraulic cylinder.

10. The light-collecting heliostat of claim 7, wherein the altitude angle adjusting unit includes a motor cylinder.

11. A light-collecting heliostat using flat mirrors, the light-collecting heliostat comprising: a support frame supported by a column; at least two reflective plates installed on a front surface of the support frame; and an angle adjusting unit interposed between the reflective plates and the support frame to adjust angles of the reflective plates so that angles between the reflective plates and the support frame are adjusted to collect lights reflected from the reflective plates on one focal area, wherein the reflective plates are fixedly installed on a front surface of a reflective plate frame, and the angle adjusting unit is interposed between the reflective plate frame and the support frame, wherein the angle adjusting unit comprises: a bolt integrally formed with a bottom surface of a connection plate installed at a corner of the reflective plate frame; and fixing nuts fastened around the bolt on top and bottom surfaces of a fixing plate while passing through a third elongated hole formed in the fixing plate installed at a corner of the support frame.

12. The light-collecting heliostat of claim 11, wherein the support frame is fixedly installed on the column by an azimuth angle adjusting unit and an altitude angle adjusting unit to adjust horizontal and vertical angles of the reflective plates.

13. The light-collecting heliostat of claim 12, wherein the azimuth angle adjusting unit comprises:
a worm wheel coupled with a lower end of an upper column on which the support frame is rotatably installed; and
a worm coupled with a shaft of a motor mounted on a lower column fixed onto a ground to rotate the worm wheel.

14. The light-collecting heliostat of claim 12, wherein the altitude angle adjusting unit includes a hydraulic cylinder.

15. The light-collecting heliostat of claim 12, wherein the altitude angle adjusting unit includes a motor cylinder.

* * * * *